March 17, 1964 L. J. OAKLAND 3,125,745

NON-DESTRUCTIVE BISTABLE MAGNETIC CORE SENSING

Filed May 29, 1959

INVENTOR
LEWIS J. OAKLAND

BY Cushman, Darby & Cushman
ATTORNEYS 3,125,745

NON-DESTRUCTIVE BISTABLE MAGNETIC CORE SENSING

Lewis J. Oakland, North St. Paul, Minn., assignor to Sperry Rand Corporation, New York, N.Y., a corporation of Delaware Filed May 29, 1959, Ser. No. 816,842
27 Claims. (Cl. 340—174)

This invention relates generally to sensing the remanent state of magnetization of a bistable magnetic core element, such as one, for example, which may be used alone in an information system, or with numerous others, in the memory section of a digital computer; and more specifically to non-destructively sensing the information content of a magnetic core.

In order to increase the operational speed of a digital computer, it is desirable to be able to readout or sense the binary information of a particular memory cell without devoting a portion of the read cycle time to a logical restoration process which is necessary in most static magnetic memories.

In the copending Pohm et al. application entitled "Non-Destructive Sensing of a Magnetic Core," Serial No. 691,902, filed October 23, 1957, and now Patent No. 3,015,807, and the copending Pohm et al. application entitled "Non-Destructive Readout of Magnetic Cores," Serial No. 722,584, filed March 19, 1958, two systems are presented for accomplishing the desired result. Both of the above systems preferably use thin film cores prepared by evaporating a suitable magnetic alloy and condensing the resulting vapor on a heated substrate, this technique being more fully described in the copending application of S. M. Rubens, Serial No. 599,100, filed July 20, 1956, now Patent No. 2,900,282.

In the former of the above Pohm et al. applications, two bistable cores, preferably thin films, are positioned in a region of magnetic influence with one another. One core, termed the "memory core," is arranged with its preferred or "easy" direction or axis of magnetization transverse to the easy direction or axis of magnetization of the second core, which may be termed the "readout core." Suitable conductors, or current sheet type drive lines, also arranged in close proximity to the memory core, are used to establish a state of negative or positive remanence in the memory core thereby indicating a binary "1" or "0" state. The remanent magnetization of the memory core produces a field transverse to the easy axis of magnetization of the readout core. By prior control of the magnetic properties of the cores, the readout core is highly susceptible to being switched by the transverse field induced therein by the memory core, while the memory core is rather insensitive to the field produced by the readout core. To achieve non-destructive sensing of the binary state of the memory core, coincident currents may be applied to various windings associated with the two cores. A current is applied to the bias winding which either tends to reinforce the external field due to the remanent magnetization of the memory core or reduce it toward zero. This momentary change of the external field of the memory core is reflected into the readout core in a direction transverse to its easy axis of magnetization. When currents of a predetermined magnitude are applied to the drive lines having a substantial effect only on the readout core, the readout core will switch only if the field produced by the remanent magnetization of the memory core is reinforced, i.e., it will not switch if the remanent field of the memory core is reduced to zero. A voltage induced in an additional sense winding during the switching of the readout core may be indicative of a binary "1" while the absence of an induced voltage at this particular time may be indicative of a binary "0." At no time does the memory core itself switch to an opposite state of remanence during the readout cycle.

The other above mentioned Pohm et al. application (Serial No. 722,584) also teaches the use of two bistable core elements, preferably of the thin film type, located in magnetic proximity with one another. In this case, however, the memory or information core is predetermined to have a somewhat larger value of coercivity than the second or readout core. Also, in this application the two cores are arranged such that their respective easy axis of magnetization are parallel rather than transverse to one another. Under these circumstances, currents through a suitably arranged drive line may be regulated so that the high coercivity memory core will not be switched upon the application of a second or so-called "interrogate field," but the readout core will shift or not according to the state in which the field produced by the memory core holds the readout core. The presence or absence of an induced voltage on a sense winding arranged to cooperate with the readout core therefore indicates the remanent state of the memory core.

The present invention also teaches the use of a pair of bistable magnetic cores, preferably of the thin film type, suitably arranged such that the field due to the remanent magnetization produced by one core interacts with the other. In this case, as in the aforementioned Pohm et al. application, Serial No. 691,902, the two films are oriented with their respective easy axis of remanent magnetization mutually perpendicular. The field produced by the memory or information core, i.e., the core in which the information to be sensed is stored, acts in a direction transverse to the easy axis of the readout core, thereby deflecting or otherwise rotating the remanence vector of the readout core to one side or the other of the easy axis depending on which of the two states of saturation the information core is in. When an interrogate pulse is applied to a suitable drive line aligned with the easy axis of the information core, a field is produced which applies a torque action to the displaced remanence vector of the readout core causing that vector to rotate further, and in one embodiment to switch in the direction determined by the direction of the initial displacement. As a result, a pulse is produced in a sense winding aligned with the easy axis of the readout core, the polarity of this pulse being dependent on the initial direction of rotation of the remanence vector in the readout core. By means of a suitable polarity detecting device, it is therefore possible to determine the binary information contained in the memory core without destroying that information.

It can be seen then that this invention differs from the aforementioned Pohm et al. teachings in that (1) the polarity of the output signal is indicative of the binary state of the information core rather than the presence or absence of a readout signal, and (2) there is no longer a need for a bias winding to temporarily reinforce or diminish the field due to the remanent magnetization of the information core.

It is therefore an object of the present invention to provide an improved system for causing non-destructive readout of a magnetic core.

Another object of this invention is the provision of a magnetic memory system comprising two bistable cores wherein the remanent state of one core may be detected without destroying the remanent state of that core in response to an interrogating field applied only antiparallel to the remanent magnetization of the second core.

Another object of this invention in conjunction with the foregoing objects is to provide an interrogation field which rotates the remanent magnetization of, but does not switch, the second core with the rotation being in a direction determined by the said one core.

Still another object in conjunction with the first two objects is the provision of an interrogating field which always switches the second core with the switching thereof being in a direction determined by the remanent state of the said one core.

Yet another object of the present invention lies in the provision of a two-core non-destructive memory sensing device which is operable without an external bias field heretofore necessary.

Yet still another object of the present invention is the provision of non-destructive sensing apparatus for a magnetic core by employing a second magnetic core disposed adjacent to the first magnetic core bearing the information to be sensed with the axis of remanent magnetization of the cores being transverse to each other, thereby causing a deflection of the remanence vector of said second core, along with means for inducing in said second core a magnetic field which at least tends to rotationally switch said second core in a direction determined by the initial deflection produced by said first core.

Still other objects of this invention will become readily apparent to those having ordinary skill in the art by reference to the following detailed description of the exemplary embodiment of the apparatus and the appended claims. The various features of the exemplary embodiment according to the invention may best be understood with reference to the accompanying drawings, wherein:

FIGURES 2A through 2C illustrate the field directions and exemplary waveforms obtained when the information core is in one state of remanent magnetization, and FIGURES 3A through 3C illustrate the field directions and exemplary waveforms obtained when the information core is in the opposite state of remanent magnetization.

Figures 1, 2, 3:
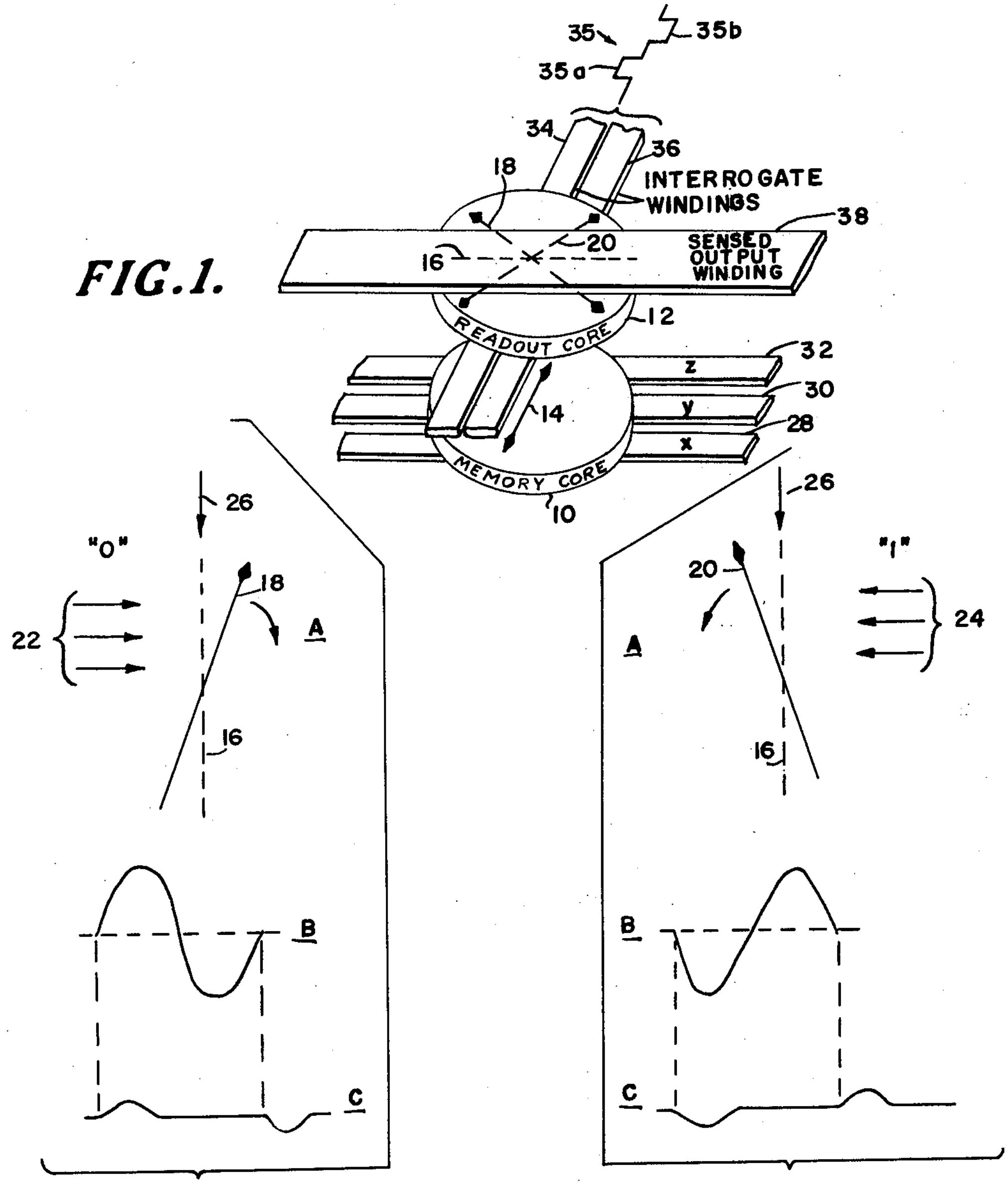
FIGURE 1 illustrates an exemplary embodiment of this invention.

Referring now to FIGURE 1 wherein is shown a pair of bistable cores 10 and 12 suitably positioned, preferably subadjacent, such that the remanent magnetic fields produced by said cores interact with one another. Core 10 is the core containing the information to be detected and may be termed the memory or information core. This core may be one of a plurality of elements such as used in a coincident current memory array, or may be considered as a single core which is used individually to store information in any type system. Core 12 termed the readout core is included to provide non-destructive readout of the memory core 10. Preferably, both of the cores 10 and 12 are of the thin film type, the formation of which is fully described in the aforementioned Rubens application, Serial No. 599,100. However, limitation to this type of core is not intended since this invention may be employed with other types of magnetic cores.

For the purpose of clarity and ease of illustration, the various substrates and insulating members normally used between the cores and between the cores and the windings, are not shown, but may be noted in the copending application of S. M. Rubens, Serial No. 626,945, filed December 7, 1956, and now Patent No. 3,030,612. In this respect, it should be understood that the film elements may be condensed on a suitable substrate such as glass and the windings formed by conventional printed circuit etching techniques. Alternatively, the conducting windings may also be formed by an evaporation process by selectively depositing copper into the substrate.

Cores 10 and 12 are located in a region of magnetic influence with one another as mentioned before. Core 10 preferably, but not necessarily, has a higher value, and more preferably a substantially higher value of coercivity than core 12. The anisotropy field for core 10 should always be of higher value than that for core 12 for safety purposes if there is a possibility of demagnetization or switching of core 10 due to a sensing field and/or any extraneous field, as will be later explained. For example, core 10 may have a relatively high coercivity of about 4 oersteds as well as a relatively high anisotropy field of approximately 10 oersteds, while core 12 has a value of coercivity and anisotropy field each of only about 2 oersteds. As is well known, the coercivity $H_c$ of a core refers to the characteristic of a core which determines the longitudinal field when acting alone required to switch the core, while the anisotropy field $H_k$ is the transverse field necessary for a core to rotate the remanent magnetization of that core 90° from its easy axis, and may also be defined as the value of the saturation magnetization $M_s$ divided by the initial susceptibility $X_0$ measured in the difficult or transverse direction of magnetization of the material, i.e.

$$H_k = \frac{M_s}{X_0}$$

The advantages of providing memory core 10 with a higher value of coercivity and anisotropy field than for the readout core, will become more apparent from the discussion hereinbelow. However, for the present it is sufficient to say that under this condition the remanent magnetization of the memory core 10 will have a more pronounced magnetic biasing effect on the readout core 12 than will the remanent magnetization of the readout core have on the memory core due to the difference in anisotropy fields, and the memory core resists change of state more than the readout core due to coercivity differences.

As shown in FIGURE 1, cores 10 and 12 are positioned such that the easy axis of magnetization 14 of the memory core is transverse to the easy axis of magnetization (indicated by dashed line 16) of the readout core. The remanent field produced by the memory core 10 therefore exerts a force tending to deflect or rotate the readout core remanence vector away from its easy axis of magnetization 16 to a new position such as indicated, vector 18 or vector 20. A clockwise rotation is produced when the memory core is in one stable state of remanent magnetization, while a counterclockwise rotation is produced when the memory core is in its opposite state of remanence.

The foregoing condition may best be illustrated with reference to FIGURES 2A and 3A. In these views, the easy axis of the readout core is again represented by dashed line 16. The direction of the field produced by the memory core when it is in its arbitrarily defined "0" state of remanence is indicated by vectors 22 in FIGURE 2A, while the direction of the field produced by the memory core when it is in its opposite or "1" state is indicated by vectors 24 in FIGURE 3A. The field produced by the memory core tends to deflect the remanence vector of the readout core in the clockwise direction as indicated by vector 18 when the memory core is in the "0" state, and in the counterclockwise direction as indicated by vector 20 when a binary "1" is stored in the memory core.

Now when an external field of suitable intensity, which may be termed an interrogation field, is applied parallel to the easy axis of the readout core as shown by vector 26, a torque is produced tending to rotationally switch the state of the readout core to its opposite state of magnetization. The direction of rotation of the magnetization vector is dependent on the direction of the initial deflection produced by the field of the memory core. When a sense or pickup winding 38 is provided for the readout core, the change in flux produced by the additional rotation of the remanent magnetization of the readout core in the same direction as biased by the memory core will induce in that winding a voltage the polarity of which is dependent on the direction of rotation. As indicated in FIGURE 2B, a rotation in the clockwise direction (indicating the sensing of a "0," for example) produces a voltage in the sense winding having a positive excursion followed by a negative excursion, while a counterclockwise rotation (indicating the sensing of a "1," for example) causes a negative-going waveform followed by a positive excursion as shown in FIGURE 3B.

By utilizing suitable phase detecting equipment (not shown) it is therefore possible to determine the information stored in the memory core without destroying that information.

In FIGURE 1, windings 28, 30 and 32 are the conventional drive lines used for coincident current alteration of the remanent state of the memory core, and as shown, are oriented transverse to the easy axis of the memory core. For example, winding 28 may be an X drive line, winding 30 may be a Y drive line, while winding 32 is a Z or inhibit line. For ease of illustration, windings 28, 30 and 32 are shown as parallel windings located in the same plane. It should be understood, however, that the preferred location of these windings is in a multi-layer configuration in close proximity to the memory core 10, for example as in the same Rubens application, Serial No. 626,945. Also these drive lines preferably have a width equal to or somewhat larger than the diameter of the core. As in conventional magnetic core arrays, a signal on either the X drive line or the Y drive line alone is insufficient to produce a change in the remanent state of the memory core. When a current of proper magnitude is applied to the X and Y drive lines concurrently and no inhibiting pulse is applied to the inhibit winding, it is possible to reverse the remanence of the memory core. Such reversal effects a change of state in the memory core, as is well known. For a single element memory, or in other situations not requiring selectivity as between memory cores, of course multiple writing windings are not necessary. Further, when the memory core is of the thin film variety or for other reasons has the ability to be switched by the rotational process, as distinguished from the wall motion process, winding means for coincident or non-coincident switching of the memory core can be oriented to give a resultant switching field which has both a longitudinal component and a transverse component, as taught in the said Rubens application, Serial No. 626,945.

Windings 34 and 36 located in close proximity to the readout core may be used alone, or in a coincident sense as desired, to apply the interrogating field 26 of FIGURES 2A and 3A. Since the easy axes of the cores are transverse to each other, interrogating field 26, which is in alignment with the easy axis 16 of the readout core, is transverse to the easy axis 14 of the memory core. This field alone cannot cause the memory core to switch, but it may at least partially demagnetize the memory core especially if it is strong enough to do so. Therefore, it is preferable to make the anisotropy field for the memory core of a relatively high value as a safety or reliability factor, for example 10 oersteds as previously indicated. Also, and regardless of whether the memory core anisotropy field is relatively high or low, if in a given situation there is any possibility of the interrogating field acting in combination with an extraneous field, such as that from the earth or other stray sources, so as to cause the memory core to switch by a rotational process, it is then preferable for safety or reliability purposes to make the coercivity of the memory core relatively high, for example 4 oersteds.

These values, of course, are relative to those for the readout core. When the memory core is shielded or is otherwise not subjected to or susceptible to extraneous fields, it is not essential (though perhaps still desirable for present day embodiments) that the coercivities of the two cores be different. Further, when the interrogating field is sufficient to cause the desired amount of rotation of vector 18 or 20, i.e., partially or fully as explained below, but is insufficient to cause in memory core 10 any adverse effects such as demagnetization or rotational switching, the anisotropy fields of the two cores need not be necessarily different though, again perhaps desirably so for the present day state of the art. It is generally preferable though not essential that the memory core should produce a higher flux or external field than the readout core.

Therefore, it is apparent that making an interrogating or sensing current pulse of the proper magnitude for any given set of memory and readout cores, will cause an interrogating field which in turn rotates the remanent magnetization of the readout core in one direction or another to indicate the state of the memory core without altering that state. Since the interrogating field should preferably be only orthogonal to the remanent magnetization of the memory core (to prevent therein any longitudinal field component which might effect switching of the memory core) the interrogation or sense winding means, for example windings 34 and 36, are oriented to provide upon receipt of a single pulse in the interrogating signal 35 a field which is fully in alignment with the readout core remanent magnetization axis 16 and which causes in the sense winding or output line 38 a signal as in FIGURE 2B or 3B.

Although only a single interrogate winding 34 or 36 is necessary to provide non-destructive readout in many applications, it is desirable to provide a selective readout of information in other applications such as in memory matrices. For this reason, two parallel windings 34 and 36 are provided. If a current pulse of predetermined magnitude is applied to only one winding, say winding 34, the interrogating field produced thereby may be insufficient to rotate the magnetization vector 18 or 20 past the so-called rotational threshold. As a result, in response to a single interrogating pulse only a "half-select" or relatively small output signal including separated positive and negative excursions of low amplitude, such as shown in FIGURES 2C and 3C will be be produced in the sense or output winding 38. Since the signals in FIGURES 2C and 3C at their beginnings (or ends) are of opposite polarity thereby indicating a "0" or "1" state in the memory core, the use of a small amplitude interrogating pulse or only one winding on the readout core fore applying a relatively low magnitude interrogating field is sufficient to provide an indication of the state of the memory core as long as the polarity or phase detecting equipment (not shown) used with output winding 38 is sensitive enough to detect the output signals as distinguished from internal or external "noise," signals for example. When the interrogating field is insufficent to rotate the magnetization vector 18 or 20, as the case may be, past the rotational threshold, the readout core is not then caused to change state. Therefore, upon subsiding of such an interrogating field, the vector returns to the biased position which it previously was in due to the magnetic influence of the memory core.

Of course, if the current pulse on a single interrogating winding 34 or 36 is of sufficient magnitude, the interrogating field is then enough to rotate the magnetization vector of the readout core past the rotational threshold. The readout core therefore changes state; and this without causing any change of state of the memory core as previously indicated. The output signal on winding 38 then is bi-polar with the positive going lobe preceding or succeeding the negative going lobe in accordance with whether the memory core is in a "0" or "1" state, as shown in FIGURES 2B and 3B. Operation in this manner is preferred over that which results in the output signals of FIGURES 2C and 3C since more accurate detection is possible.

Although either of the above mentioned embodiments in which a single interrogating winding is used, can be employed in most cases wherein the memory core is not in an array and consequently, or otherwise needs not be sensed selectively or to the exclusion of other cores, it becomes desirable in a core matrix for example to provide for reading the contents of cores selectively as is well known. To accomplish this in a non-destructive manner, this invention provides for passing a "half-pulse," i.e., one of reduced amplitude, such as indicated by any pulse in signal 35 simultaneously through both interrogating windings 34, 36. The resulting collective interrogate field represented by vectors 26 in FIGURES 2A and 3A, is then sufficient to rotate the magnetization vector of the readout core past the rotational threshold, thereby producing a full output pulse such as one of those shown in FIGURES 2B and 3B.

Again, windings 34 and 36 are illustrated in FIGURE 1 as lying in the same plane. In a preferred embodiment, it is desirable to have these windings in a stacked or multi-layer arrangement either above or below the readout core as taught in the same Rubens application, Serial No. 626,945. Also the width of these windings is preferably greater than the diameter of the readout core as mentioned before, to insure a greater coupling of magnetic fields between the core and said windings.

To obtain optimum readout signals, i.e., to obtain the best compromise between noise and readout signals, the sense line 38 is aligned with the easy axis of the readout core, although it may be disposed at an angle thereto, if desired, at a sacrifice of the signal-to-noise ratio.

To improve the signal-to-noise ratio further in a matrix of memory array utilizing the readout technique of this invention, the output of FIGURES 2B and 3B can be strobed or otherwise gated out at the second maximum and the reading taken at this time. In this manner, the "half select" pulse shown in FIGURES 2C and 3C resulting from the application of an interrogate pulse to only one interrogate winding 34 or 36 would not appear in the output signal.

While the memory core information is sensed so as to cause an output signal as in FIGURE 2B or 3B on winding 38, the readout core changes from its initial state to its opposite state. In FIGURES 2B, C and 3B, C the vertical dash lines represent the beginning and ending times of interrogate pulses such as pulse 35*a*. While the second lobe of the signals in FIGURES 2B and 3B is shown somewhat is idealized, it in reality, may be of lesser amplitude and/or duration than the first lobe, i.e., it may have completely ended (or at least so for all practical purposes) even before the interrogate pulse ends. Nevertheless, the second lobe of any such readout signal is sufficient in amplitude and duration to be detected for purposes indicated in the preceding paragraph.

The change in state of readout core 12 may be due to pulse 35*a* for example, when it causes an interrogation field 26 in alignment with but antiparallel to the remanent magnetization of the readout core, i.e., in full opposition to that remanent magnetization. Basically it is not essential to this invention to return the readout core to its initial or reference state after each sensing, since a subsequent interrogation pulse such as pulse 35*b* can cause an output signal on sense line 38 like that of FIGURE 2B or 3B which indicates by its phase the state of the memory core. However, even when the memory core is in the same state for two successive sensings by opposite polarity interrogation pulses, the two output signals on line 38 will be of opposite polarity. That is, with core 10 in the "0" state, pulse 35*a* may cause an output signal as in FIGURE 2B, while pulse 35*b* (without intervening change of state of the memory core) will cause an opposite polarity output signal like that in FIGURE 3B. This opposite polarity output signal will not occur, however, if the state of the memory core is changed between sensings without restoring the readout core to its reference state, since the output signal will then be like that in FIGURE 2B again. This means that unless the readout core is returned to its reference state after each sensing, means (not shown) should be provided to keep track of the past history of the memory and readout cores. This presents quite a bookkeeping problem, and the easier way is to return the readout core to its reference state after each sensing.

Of course, if the readout core is operated in a nonswitching mode so as to cause output signals as in FIGURES 2C and 3C, the readout core does not change state but relaxes to its reference state upon release of each interrogation pulse, and subsequent restoring is unnecessary.

Whenever the relative anisotropy fields and/or coercivities of the memory and readout cores are such that they might or actually do allow the readout core to be demagnetized fully or even partially during any change of state of the memory core, it is preferred if not essential for complete reliability to make sure that the readout core is always in one of its two states for example its reference state, before applying an interrogation pulse. This may be done by applying a restore or magnetizing pulse before each interrogation pulse. For example, pulse 35*a* can be considered a preceding restore pulse while pulse 35*b* is the interrogation pulse. With a restore-magnetizing pulse immediately preceding each interrogation pulse, there is generally no need for a restore pulse immediately following each interrogation pulse.

The restore or magnetizing operation preceding interrogation may be employed with a system such as results in output signals like those in FIGURES 2C and 3C if the readout core is likely to be demagnetized during memory core change of state.

Either of the preceding or succeeding restore operations for the readout core above discussed should not be confused with the conventional restore operation employed in coincident current memories. In the conventional memory, logical operations are required to rewrite the information back into the memory core. In this invention, however, the readout is non-destructive so that the memory core rewrite operation becomes unnecessary. To restore the readout core of this invention to its normal or reference state no logical operation is necessary since all that is required is a pulse opposite in polarity from the interrogate pulse which was applied to the interrogate winding causing the readout core remanent magnetization to rotate and provide a readout indication by its direction of rotation. As previously indicated, a signal such as 35 in FIGURE 1 will provide the necessary interrogating field as well as the restoring field required to switch the readout core back to its normal or standby state.

The concept of this invention may of course be extended to include the non-destructive readout of a memory matrix comprised of a plurality of memory cores, each core having associated therewith a readout core and winding means as previously described in connection with FIGURE 1.

Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for non-destructively sensing the remanent state of a core comprising at least two magnetic cores each having a preferred axis of magnetization and two stable states of magnetic remanence oriented in opposite directions along its said axis, said cores being arranged adjacent one another with their said axes being transversely oriented in respective parallel planes, and means including means for producing a magnetic field along the preferred magnetization axis of only one of said cores, for causing in that core in-plane rotation of the remanent magnetization in one direction or another in accordance with whether the other core is in one or the other of its states so as to indicate by the direction of said rotation the state of said other core without changing the state thereof.

2. Apparatus as in claim 1 wherein the field producing means provides a field sufficient to rotate the remanent magnetization of said one core toward the rotational switching threshold thereof but said field is insufficient to change the state of said one core.

3. Apparatus as in claim 1 wherein the field producing means causes said one core to change state at least once.

4. Apparatus as in claim 1 wherein the field producing means changes said one core from one state to the other and then back to said one state.

5. Apparatus as in claim 1 wherein said cores are thin ferromagnetic films.

6. Apparatus as in claim 1 wherein said field producing means are printed circuit winding means.

7. Apparatus for non-destructively sensing the remanent state of a core comprising at least two magnetic cores each having a preferred axis of magnetization and two stable states of magnetic remanence oriented in opposite directions along its said axis, said cores being arranged adjacent one another with their said axes being transversely oriented in respective parallel planes, one of said cores having a substantial magnetic biasing effect on the other core, and means, including means for producing a magnetic field along the preferred magnetization axis of said other core, for changing the magnetic state of that core by in-plane rotating the remanent magnetization thereof in one direction or another depending upon whether the said one core is in one or the other of its states so as to indicate by the direction of the said rotating the state of the said one core without destroying the state thereof.

8. Apparatus comprising at least a memory core and a readout core each having a preferred axis of magnetization and two stable magnetic states oriented in opposite directions along its said axis, said memory core being disposed adjacent said readout core with their said axes being transversely oriented in respective parallel planes, the cores being characterized to cause the remanent magnetization of the memory core to have a biasing effect on the readout core by providing a first field transverse to and in the plane of the remanent magnetization of the readout core for in-plane rotating the magnetization of the readout core away from its preferred axis but not beyond the rotational switching threshold of the readout core, the rotation being in one of two directions depending upon the state of the memory core, and means for applying a second field along the plane of the preferred axis of said readout core to cause the remanent magnetization thereof to in-plane rotate more in the same direction as biased by the memory core remanent magnetization to provide for an indication by the direction of rotation upon application of said second field of the state of the memory core without altering that state.

9. Apparatus as in claim 8 wherein the memory core has a substantially larger coercivity than the readout core.

10. Apparatus as in claim 8 wherein the memory core has a substantially larger anisotropy field than the readout core.

11. Apparatus as in claim 8 wherein the memory core has a substantially larger coercivity and anisotropy field than the readout core.

12. Apparatus as in claim 8 wherein said cores are thin ferromagnetic films.

13. Apparatus comprising at least a memory core and a readout core each having a preferred axis of magnetization and two stable magnetic states oriented in opposite directions along its said axis, said memory core being disposed adjacent said readout core with their said axes being transversely oriented in respective parallel planes, the cores being characterized to cause the remanent magnetization of the memory core to have a biasing effect on the readout core by providing a first field transverse to and in the plane of the remanent magnetization of the readout core for in-plane rotating the magnetization of the readout core away from its preferred axis but not beyond the rotational switching threshold of the readout core, the rotation being in one of two directions depending upon the state of the memory core, and means, including means for applying a second field along the plane of the preferred axis of said readout core for causing that core to change its state by in-plane rotating the remanent magnetization thereof beyond its rotational threshold in the same direction as biased by the memory core remanent magnetization to provide for an indication by the direction of rotation upon application of said second field of the state of the memory core without altering that state.

14. Apparatus for non-destructively sensing the state of a magnetic core comprising at least a memory core and a readout core, each core being of the thin film type and having two stable magnetic states and an axis of remanent magnetization, said cores being arranged adjacent to one another with their said axes being transversely oriented in respective parallel planes of said films, the coercivity and anisotropy field of said memory core being substantially larger than the coercivity and anisotropy field of said readout core such that the remanent magnetization of said memory core produces in the plane of said readout core a first field sufficient to in-plane rotate the remanent magnetization of said readout core away from said axis of remanent magnetization of said readout core but insufficient to rotate said remanent magnetization beyond the rotational threshold of said readout core, means including first winding means associated with said readout core for applying a second field antiparallel to and in the plane of said axis of remanent magnetization of said readout core, said second field being of sufficient strength to exceed the rotational threshold of said readout core thereby switching said readout core to its other state of remanent magnetization, the direction of rotation being in the direction of the initial rotation produced by said first field, and further including second winding means associated with said readout core for sensing the change in flux resulting from said switching of said readout core.

15. Apparatus as in claim 14 wherein said first and second winding means comprise printed circuits.

16. Apparatus as in claim 14 wherein said first winding means is comprised of at least two parallel printed circuit lines to provide coincident current switching of said readout core.

17. Apparatus for non-destructively sensing the state of a magnetic core comprising at least a memory core and a readout core both being of the thin ferromagnetic film type and each having two stable states of remanent magnetization and an axis of remanent magnetization, said cores being arranged subadjacent to one another with their said axes being transversely oriented in respective parallel planes of said films, the coercivity and anisotropy field of said memory core being substantially larger than the coercivity and anisotropy field of said readout core such that the remanent magnetization of said memory core produces in the plane of said readout core a first field of sufficient strength to in-plane rotate the remanent magnetization of said readout core away from said axis of remanent magnetization of said readout core in a direction determined by the state of remanent magnetization of said memory core but insufficient to rotate said remanent magnetization beyond the rotational threshold of said readout core whereas the remanent magnetization of said readout core is insufficient to produce a field in said memory core of sufficient strength to produce at least any substantial rotation of the remanent magnetization of said memory core, means including first winding means comprised of two parallel current sheets associated with said readout core for applying by coincident currents therein a field antiparallel to and in the plane of the readout core axis of remanent magnetization of sufficient strength to in-plane rotate the axis of said readout core beyond its rotational threshold thereby switching said readout core to its other state of remanent magnetization, the direction of rotation being in the direction of the initial rotation produced by said first field, and further including second winding means aligned parallel with said axis of remanent magnetization of said readout core for sensing the change in flux resulting from the switching of said readout core, the polarity of the voltage resulting from said change in flux being indicative of the remanent state of said memory core.

18. Apparatus as in claim 17 and further including winding means associated with said memory core for selectively altering the remanent state of said memory core by means of coincident currents.

19. Apparatus as in claim 18 wherein the last mentioned winding means comprises a plurality of printed circuit current sheets located in at least one plane substantially parallel with respect to the plane of said memory core and in close proximity thereto so that currents through the current sheets produce a field in said memory core transverse to the axis of remanent magnetization of the readout core.

20. The method of operating a non-destructive sensing system which includes a bistable memory core magnetically biasing an adjacent bistable readout core with their preferred remanent magnetization axes being transverse and having winding means oriented to provide an interrogation field antiparallel only to the remanent magnetization of the readout core upon receipt of an interrogation signal, comprising the steps of applying said interrogation signal and causing the remanent magnetization of the readout core to rotate in one direction or the other in dependence upon the state of the memory core without causing that state to change.

21. The method of operating a non-destructive sensing system which includes a bistable magnetic core magnetically biasing an adjacent bistable readout core with their preferred axes of remanent magnetization being transverse and having winding means oriented to provide an interrogation field antiparallel only to the remanent magnetization of the readout core upon receipt of an interrogating signal, comprising the steps of applying a pulse of one polarity to said winding means for assurance that the readout core is in a given one of its bistable states before interrogation of the memory core, and applying to said winding means a second pulse of opposite polarity to said first mentioned pulse to cause the remanent magnetization of the readout core to rotate further in the direction biased by the memory core without causing the state of the memory core to be altered.

22. A non-destructive magnetic element sensing system comprising a bistable magnetic element having a magnetization axis along which the remanent magnetization of the element lies in first or second directions respectively representing first and second bistable states, means for applying a first magnetic field to said element at an angle to said axis for biasing the remanent magnetization to a position which is an angular distance from said axis in a clockwise rotational direction when the element is in one of said states and in a counterclockwise rotational direction when the element is in the other state without switching the element to its opposite stable state, means for applying to said element during the existence of said first field a second field which even in conjunction with said first field is insufficient to switch said element to its opposite stable state, for causing the remanent magnetization to rotate from its biased position at least when said element is in its first state, and output means for sensing any change in the remanent magnetization after said first and second fields are applied to provide an output signal indicative of the state of said element.

23. A nondestructive sensing system as in claim 22 wherein the first field applying means is a second magnetic element.

24. A system as in claim 23 wherein the second magnetic element has a remanent magnetization axis which is oriented at an angle to the magnetization axis of the first mentioned magnetic element.

25. A system as in claim 22 wherein the first field applying means is a second bistable magnetic element having a remanent magnetization axis oriented transversely of the magnetization axis of the first mentioned bistable magnetic element so that the transverse field of the second element is the said first magnetic field, and wherein the second field applying means applies the second field parallel to the remanent magnetization axis of the first mentioned bistable element, the arrangement being such that the output means senses the direction of rotation of the remanent magnetization of the first mentioned element from its position as biased thereto by the transverse field of the second magnetic element and provides an output signal of one polarity or the other to indicate the state of the said second bistable element without destroying the state thereof.

26. A system as in claim 22 wherein said bistable magnetic element is a magnetic film containing said magnetization axis in its plane, and wherein said first magnetic field applying means causes the said first field to be applied parallel to said plane at said angle to said axis to effect rotation of said remanent magnetization substantially in said plane throughout said angular distance.

27. A system as in claim 22 wherein said bistable magnetic element is a magnetic film containing said magnetization axis in its plane, said first field applying means being a second bistable magnetic film disposed parallel to the first mentioned film and having a remanent magnetization axis lying in its plane transversely of the said first film axis so that the transverse field of the second element is the said first magnetic film, wherein the second field applying means applies the second field parallel to the said first film axis, and wherein the output means senses the direction of rotation of the first film remanent magnetization from its position as biased thereto by the said transverse field of the second film and provides an output signal of one polarity or the other to indicate the state of the said second bistable element without destroying the state thereof.

References Cited in the file of this patent

UNITED STATES PATENTS 2,984,825 Fuller ---------------- May 16, 1961

OTHER REFERENCES

Publication I, "Nondestructive Sensing of Magnetic Cores," D. A. Buck, Communications and Electronics, January 1954, pp. 822–830.

Publication II, "A Compact Coincident-Current Memory," A. V. Phom, Proceedings of Eastern Joint Computer Conference, Dec. 10–12, 1956, pp. 120–123.

Publication III, "Thin Films, Memory Elements . . .", Electrical Manufacturing, vol. 61, No. 1, January 1958, pp. 95–98.

Publication IV, "Computer Elements," Electrical Manufacturing, February 1959, pp. 56–60.